United States Patent
Lightner

[15] 3,680,377
[45] Aug. 1, 1972

[54] FLUID FLOW METER

[72] Inventor: Gene E. Lightner, Kennett Square, Pa.

[73] Assignee: Hewlett-Packard Company, Palo Alto, Calif.

[22] Filed: Aug. 17, 1970

[21] Appl. No.: 64,328

[52] U.S. Cl. .................................................73/204
[51] Int. Cl. ...........................................G01f 1/00
[58] Field of Search .........................................73/204

[56] References Cited

UNITED STATES PATENTS 2,650,496 9/1953 Middleton et al. ..............73/204
2,994,222 10/1961 Laub ..............................73/204

Primary Examiner—Jerry W. Myracle
Attorney—Stephen P. Fox

[57] ABSTRACT

A fluid is passed through first and second thermally conductive porous conduit elements spaced apart from one another along the path of fluid flow. A heater and a temperature sensor are mounted on each porous element and operated to maintain the two elements at constant preset differential temperatures. Flow rate of the fluid is indicated by the electrical power supplied to the heater on the second porous element to maintain the preset temperature differential. Temperature controlled metal cylinders surround the porous elements to insulate them from the adverse effects of the ambient temperature. A shaped conduit between the porous elements further minimizes heat loss from the fluid and improves measurement accuracy.

9 Claims, 5 Drawing Figures

INVENTOR
GENE E. LIGHTNER

BY Stephen P. Fox
ATTORNEY

PATENTED AUG 1 1972 3,680,377
SHEET 2 OF 2
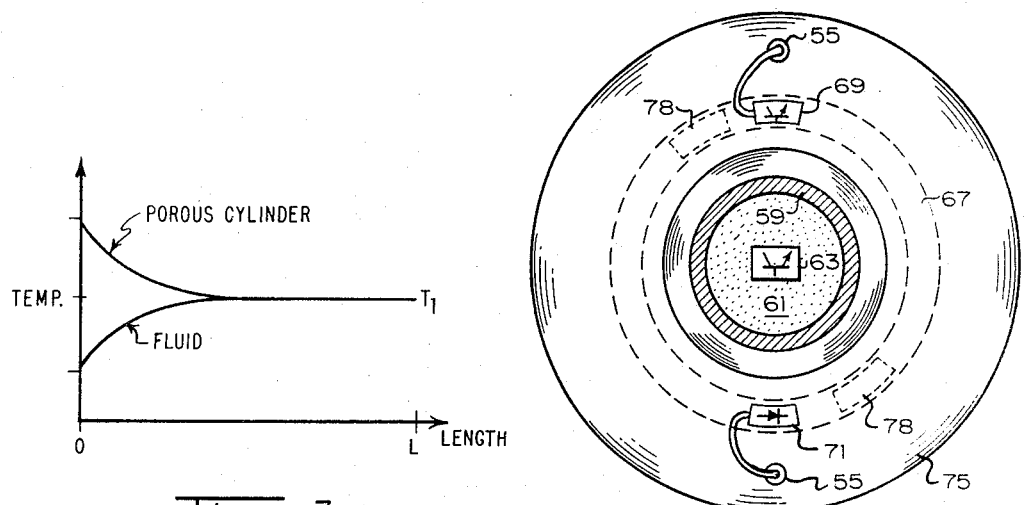
Figure 3
Figure 4
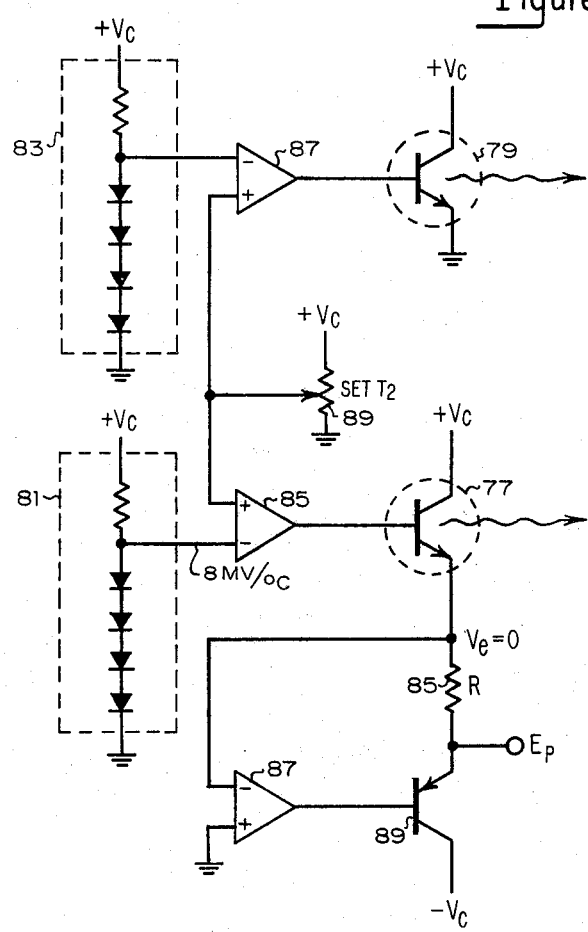
Figure 5
INVENTOR
GENE E. LIGHTNER
BY
ATTORNEY

FLUID FLOW METER

BACKGROUND OF THE INVENTION

The present invention relates to an apparatus for measuring the flow rate of a fluid through a conduit. In a typical prior art fluid flow meter, an electrical heating element is disposed in the path of a fluid flowing through a conduit and the fluid temperature is sensed both upstream and downstream of the heating element. In theory, the fluid flow rate $dM/dt$ is determined on the basis of the following equation:

$$(1) \qquad \frac{dM}{dt} = \frac{P_h}{k \int_{T_u}^{T_d} C_p dT}$$

where $P_H$ is the electrical power applied to the heating element, $k$ is a conversion constant, $C_P$ is the thermal heat capacity of the fluid, and $T_u$, $T_d$ are the upstream and downstream fluid temperatures, respectively, However, in practice the integral is approximated as follows:

$$(2) \qquad \int_{T_u}^{T_d} C_p dT \cong \overline{C_p}(T_d - T_u)$$

where $\overline{C_p}$ is the average value of the thermal heat capacity of the fluid, which is a function of the temperatures $T_d$ and $T_u$.

In a system of the type described above, constant power $P_H$ is applied to the heating element and the temperature difference $(T_d - T_u)$ is measured. Generally, such a system will measure flow rates with an accuracy of about two or three percent, which is not satisfactory in many applications. Greater accuracies are difficult to obtain because the actual values of the temperatures $T_u$, $T_d$ as well as the difference between them are difficult to measure and maintain, and they may vary from one measurement to the next. There may be adverse effects from the ambient temperature. For example, heat may be lost through the conduit walls which confine the fluid stream. Also, as stated above, the thermal heat capacity $C_p$ varies with the system operating temperature for all but monatomic gases. In addition, it is difficult to achieve both a linear relation between the flow rate and the electrical power input to the heater, and a uniform sensitivity for flow rates measured over a broad range. Any non-linearities in the temperature sensing devices for measuring $T_u$ and $T_d$ directly affect measurement accuracy and low cost linear temperature sensors are difficult to obtain. Further, the temperatures sensed are dependent on the profile of the fluid flowing through the conduit of the flow meter. Thus, the electrical power input $P_H$ to the heating element is only an approximate indication of the flow rate.

SUMMARY OF THE INVENTION

In the embodiment of the invention illustrated, a fluid whose flow rate is to be measured is passed through first and second zones spaced apart from one another along a flow path in a conduit. Each zone includes a semiconductor heater and temperature sensor in the fluid flow path for maintaining the fluid temperature at a predetermined constant level, the temperature in the second zone being a predetermined increment above that in the second zone. Fluid flow rate is indicated by the electrical power applied to the heating element in the second zone to maintain this zone at the preset constant temperature. Adverse effects from ambient temperature changes are minimized by a thermally conductive cylinder means externally surrounding each zone of the fluid conduit and in thermal contact therewith. A semiconductor heater and temperature sensor are disposed in thermal contact with each cylinder, and control circuitry maintains the external surface of the conduit at the same temperature as the flow path internal to the conduit in the corresponding zone. In each zone, the temperature sensors internal and external to the conduit and the associated control circuitry precisely regulate the power applied to the internal and external heaters. An additional thermally conductive shaped conduit means is disposed between the two zones and in thermal contact with the first zone for minimizing heat loss from the fluid during passage from the first to the second zones. Uniform heat transfer to the fluid in each zone is achieved by passing the fluid through a porous thermally conductive element formed of sintered metal, for example.

The invention provides a flow meter which indicates fluid flow rates with high accuracy, on the order of 0.1 percent, and provides a linear response over a broad range. Once the flow meter is calibrated, flow rates are measured on an absolute and repeatable basis.

BRIEF DESCRIPTION OF THE DRAWINGS

FIG. 3 is a graph illustrating the temperature distribution in a porous thermally conductive element forming a portion of the fluid flow path.

FIG. 4 is a cross-sectional view taken along the line 4—4 of FIG. 2.

FIG. 5 is a schematic diagram of the heater and sensor circuit in the preferred embodiment of the invention.

DESCRIPTION OF THE PREFERRED EMBODIMENT

Figure 1:
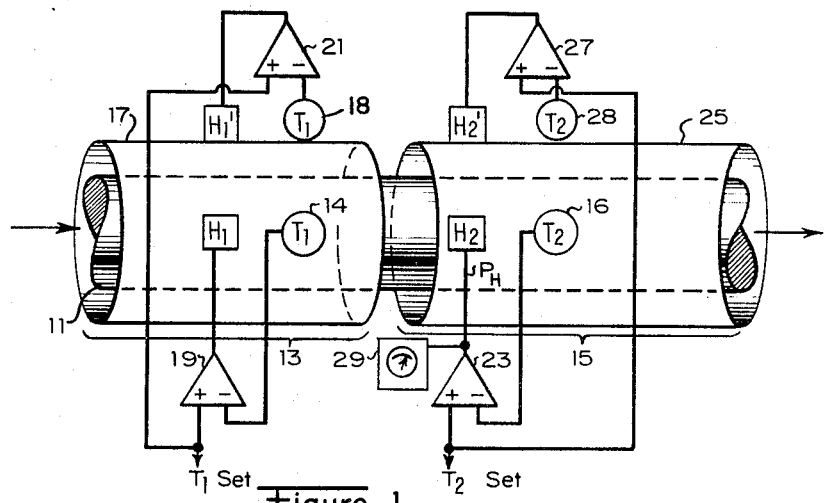
FIG. 1 is a diagrammatic illustration of the flow meter of the present invention in simplified form.

Referring now to FIG. 1, a fluid whose flow rate is to be measured is introduced into a conduit 11. In a first zone 13 of the conduit, the fluid is heated by an electrical heat $H_1$ to a predetermined temperature $T_1$ which is sensed by a temperature sensor 14. Thereafter, the fluid travels through a second zone 15 where it is heated by an electrical heater $H_2$ to a predetermined temperature $T_2$ sensed by a temperature sensor 16. The temperature $T_2$ is higher than the temperature $T_1$ by a preset increment.

In each of the zones 13, 15, a thermally conductive jacket surrounds the conduit to insulate the conduit from the effects of the temperature of the surrounding environment, and thereby to prevent heat loss to the environment from the fluid flowing through the conduit. In zone 13, the thermally conductive jacket 17 is heated to the same temperature as the fluid flowing through the conduit by a heater $H_1'$. The temperature of the jacket 17 is sensed by a temperature sensor 18. Heater $H_1$ is controlled by a differential amplifier circuit 19, one input of which receives the output of temperature sensor 14, and the other input of which receives a control voltage which is adjustable to set the desired value of temperature $T_1$. Once the temperature $T_1$ is set, this temperature is maintained internally of the conduit by the feedback control circuit. Heater $H_1'$ is controlled by a differential amplifier circuit 21 responsive to the temperature sensor 18 and the $T_1$ set control voltage to maintain a zero temperature difference between the thermally conductive jacket 17 and the internal portion of the conduit 11. Thus, in the first zone 13, both the jacket 17 and the fluid in the conduit are maintained at the temperature $T_1$.

Similarly, in zone 15, heater $H_2$ is controlled by differential amplifier 23 in a feedback circuit responsive to the temperature sensor 16 to maintain the temperature which is preset at the control input of this amplifier. Also, a thermally conductive jacket 25 surrounds the conduit 11 in zone 15, and a heater $H_2'$ is controlled by a differential amplifier 27 in response to the output from a temperature sensor 28 and the $T_2$ set control voltage to maintain both the internal portion of conduit 11 and the external portion of the conduit surrounded by jacket 25 at the preset temperature $T_2$.

The control inputs of differential amplifiers 19, 21, 23, and 27 are preset so that the temperature $T_2$ in zone 15 is a predetermined increment higher than the temperature $T_1$ in zone 13. Typically, this temperature increment is on the order of 60° C; however, other temperature increments may be used, depending on the power input to the heater $H_2$ and the flow rate being measured. A meter 29 and associated circuitry therefor measures the electrical input power $P_H$ supplied to the heater $H_2$ in order to maintain the temperature $T_2$ at the predetermined temperature increment above the temperature $T_1$. The general theoretical relationship between the power $P_H$ and the fluid flow rate $dM/dt$ is given by equation 1 above. A feature of the present invention is that the temperatures $T_1$ and $T_2$ are maintained at constant predetermined values and these temperatures are related to one another by a constant predetermined increment. Also, heat loss from the fluid flowing through the conduit 11 to the environment is minimized because of the effect of the two jackets 17, 25 surrounding the conduit, as described in more detail hereinafter. This insures adiabatic operation of the system. Therefore, the integral of equation (1) becomes a definite integral, wherein the limits $T_u$ and $T_d$ correspond respectively to the temperatures $T_1$ and $T_2$. For a given fluid, the average thermal heat capacity $\overline{C_p}$ remains constant because the temperatures $T_1$, $T_2$ are constant. Thus, equation 1 for the fluid flow rate, $dM/dt$, in gram mols per minute is simplified as follows:

$$\frac{dM}{dt} = \frac{P_H}{k\overline{C_p}(T_2 - T_1)}$$

where the power $P_H$ is expressed in watts, the temperatures $T_1$, $T_2$ are in degrees centigrade, the average thermal heat capacity $\overline{C_p}$ is in calories per gram mol per degree centigrade and $k$ is a units conversion constant having a value of .0698 watts per calorie per minute. It is to be noted that equation (3) yields a more exact value of the flow rate $dM/dt$ than the approximate results obtained with the previously described prior art apparatus.

Figure 2:
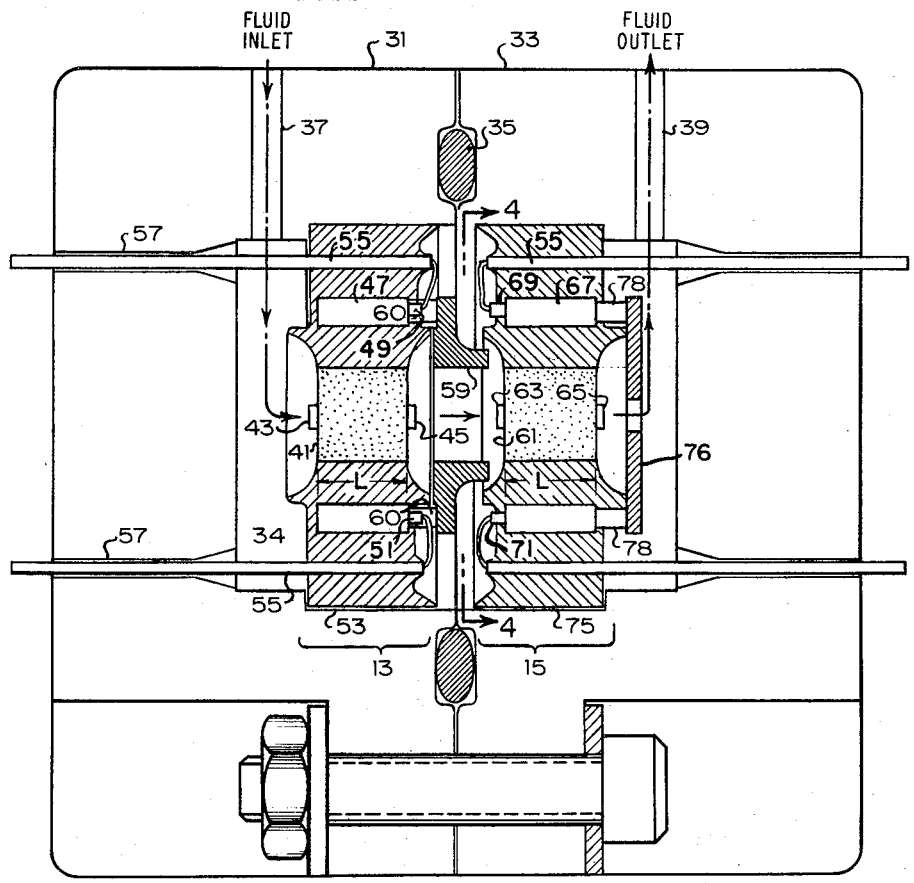
FIG. 2 is a cross-sectional view of the preferred embodiment of the invention.

FIG. 2 illustrates in more detail the preferred embodiment of the invention. There is shown a mid-plane cross section of the flow meter. Two symmetrical hollowed-out blocks 31, 33 are bolted together to form a housing having an internal cavity 34. Preferably, the blocks 31, 33 are formed of a plastic such as polyphenylene oxide. A deformable ring 35 provides a tight seal of the cavity against the effects of the external environment. A fluid, for example a gas, whose flow rate is to be measured is fed into the cavity through an inlet bore 37 in block 31 and directed out of the cavity through a bore 39 in block 33. Gas enters the inlet bore 37 and flows through a porous thermally conductive cylinder 41 in the first zone 13 where it is heated to the temperature $T_1$. The porous cylinder 41 insures that gas flowing therethrough is heated uniformly to the temperature $T_1$ and thus overcomes the adverse effects of any uneven flow profile of the gas as it enters the first zone. Preferably, the cylinder 41 is constructed of a sintered metal having a high thermal conductivity, such as silver. The heating element corresponding to the heater $H_1$ in FIG. 1 is a transistor 43 bonded in thermal contact with the porous cylinder 41 on the upstream end thereof. Bonded in thermal contact with the downstream end of the porous cylinder 41 is a semiconductor temperature sensor 45 corresponding to the sensor 14 in FIG. 1. The transistor heater and temperature sensor are described in more detail hereinafter.

FIG. 3 illustrates the temperature distribution along the length L of the porous cylinder 41 in the direction of flow of the gas, as well as the thermal gradient of the gas as it passes through the porous cylinder 41. It can be seen that cylinder 41 is made long enough to insure that the transistor heater 43 heats the gas to the preset temperature $T_1$ by the time it reaches the temperature sensor 45. Typically, the length L is on the order of .125 inches for measuring flow rates in the range of 0.1 to 10.0 gram milimols per minute.

Surrounding the porous cylinder 41 (FIG. 2) is a thermally conductive tube or ring 47 preferably constructed of copper. The tube 47 corresponds to the insulating jacket 17 in FIG. 1. Mounted in thermal contact with the tube 47 is a transistor heating element 49 and a semiconductor temperature sensor 51. The heater 49 and temperature sensor 51 correspond respectively to the heater $H_1'$ and sensor 18 in FIG. 1. The porous metal cylinder 41 and the tubular metal jacket 47 are disposed in the cavity and held in fixed spaced apart relationship to one another in a molded disc 53 constructed of an epoxy or plastic material. The disc material also serves to thermally insulate the porous cylinder 41 from the metal ring 47. Also, molded into the disc are a plurality of input and output leads 55 for coupling the heating and sensing elements to external control circuitry; however, in FIG. 2, only two wire leads 55 are shown. The input and output leads are coupled out of the housing through bores 57 therein.

After the gas leaves porous cylinder 41, it is directed through a shaped thermally conductive conduit 59 having a cylindrical internal surface. The conduit 59 is disposed in thermal contact with copper extensions 60 of the metal ring 47 of the first zone and thus is maintained at the temperature $T_1$. The thermally conductive conduit 59 insures minimum heat loss from the gas while it is flowing from the first zone to the second zone.

The second zone of the flow meter, and the conduit 59 are shown in FIG. 4 as well as FIG. 2. In the second zone, the configuration and operation of the elements are similar to those of the first zone. Specifically, there is provided a second porous metal cylinder 61 having mounted thereon a transistor heating element 63 and a semiconductor temperature sensor 65. Also, a thermally conductive metal tube 67 forms a jacket surrounding the porous cylinder 61 and has mounted in thermal contact therewith a transistor heater 69 and a semiconductor temperature sensor 71. The input and output leads for the heater and sensor on the thermally conductive jacket 67 and the porous cylinder 61 are provided by wire leads which pass through the housing block 33. The porous cylinder 61, the jacket 67, and the wire leads are all embedded in a plastic disc 75. The temperature distribution along the length of the porous cylinder 61 is similar to that shown in FIG. 3 except that the gas flowing therethrough is raised to the temperature $T_2$ rather than $T_1$.

After the gas exits from downstream end of porous cylinder 61, it passes through an aperture in a baffle plate 76 and thence out of the cavity through the gas outlet 39. Baffle plate 76 is maintained at the temperature $T_2$ of the ring 67 by copper extensions 78 which are similar to the copper extensions 60 in the first zone.

FIG. 5 illustrates in detail the control circuit for the heaters and temperature sensors for the second zone of the flow meter. Transistors 77, 79 correspond respectively to the heating elements 63, 69 in the second zone 15 shown in FIGS. 2 and 4. Each of these transistors produces a thermal energy output in accordance with the control signal on the base electrode thereof. The diode circuits 81, 83 correspond respectively to the temperature sensors 65, 71. Each of the circuits 81, 83 includes a series string of four diodes coupled through a resistor to a constant voltage source $V_c$. The diodes are silicon diodes which are temperature sensitive. The voltage drop across each diode changes at the rate of two millivolts per degree C, thus the total voltage drop across the diode string has a temperature sensitivity of eight millivolts per degree C. The output voltages from the two diode circuits 81, 83 are applied respectively to differential amplifiers 85, 87, which in turn respectively control the two heater transistors 77, 79. The collectors of transistors 77, 79 are coupled to a constant voltage source $+V_c$. The temperature $T_2$ is set by adjusting a variable potentiometer 89. The overall operation of the heater and temperature sensor circuitry is as described with reference to FIG. 1 hereinabove.

The power input to the heater transistor 77 is measured by holding the collector-emitter voltage constant and measuring the current therethrough. A feedback circuit, including a differential amplifier 87 and a transistor 89, operates to regulate the emitter voltage $V_e$ to maintain it constant at ground level, i.e., at zero volts. Therefore, the current supplied to transistor 77 is indicated by the voltage drop $E_p$ across an emitter resistor 85 which has a value R, and the power $P_H$ supplied to this transistor may be expressed by the following equation:

$$P_H = V_c I_c = V_c E_p / R \quad (4)$$

By substituting this expression into equation 3 above, the following expression for flow rate is obtained:

$$dM/dt = V_c / (k \overline{C_p}(T_2 - T_1) R E_p) \quad (5)$$

where the terms $V_c$, $k$, $\overline{C_p}$, $T_1$, $T_2$ and R are all physical constants or adjustable parameters. Therefore, once the flow meter is calibrated, the flow rate $dM/dt$ is indicated directly in terms of the voltage $E_p$. This voltage can be measured by any suitable analog or digital voltmeter.

Calibration of the flow meter may be achieved in several ways. According to one method, all of the terms forming the coefficient of the voltage $E_p$ may be measured or suitably set to express this coefficient as a single numerical constant. Thereafter, the flow rate $dM/dt$ is determined merely by multiplying this constant coefficient by the voltage $E_p$ measured for an unknown gas flow rate. According to another method of calibration, if the term $(T_2-T_1)$ is fixed but the value thereof is unknown, either $V_c$ or the value R or resistor 85 may be set to obtain a desired value of $E_p$ for a known flow rate. Thereafter, an unknown rate of flow can be determined by comparing the voltage $E_p$ corresponding thereto with the known voltage $E_p$ previously determined for the known flow rate.

The transistor heaters and the diode temperature sensors and associated control circuits therefor in the first zone of the flow meter are similar in configuration and operation to the circuit of FIG. 5 for the second zone of the flow meter. However, the power input to the heater transistor 43 is not measured, so it is not required to use the feedback circuit including transistor 89 and differential amplifier 87 for maintaining the emitter voltage constant. It is to be noted that the temperature sensors in both the first and second zones need not provide a linear output because the temperatures $T_1$ and $T_2$ are maintained constant. Thus, the temperature sensors may be one or more inexpensive silicon diodes rather than some other more complex device, provided that the voltage vs. temperature transfer characteristics of the silicon diodes for constant current therethrough do not drift with age. The flow meter in use has been found to provide flow rate measurements which are reproducible to an accuracy of about 0.1 percent over a range of flow rates from 10 to 300 cubic centimeters per minute.

I claim:

1. An apparatus for measuring the flow rate of a fluid along a path of travel comprising:
    means defining a first zone in said path of travel for electrically heating said fluid to a first predetermined constant temperature;
    means defining a second zone in said path of travel downstream from said first zone for electrically heating said fluid to a second predetermined constant temperature higher than said first predetermined constant temperature;
    said means defining said first zone and said means defining said second zone each including:
        an electrical heating element disposed in said path of fluid travel;
        an electrical temperature sensor disposed in said path of fluid travel; and circuit means responsive to said temperature sensor for controlling the power supplied to said electrical heating element to maintain the temperature of the fluid in the corresponding zone at a preset constant level;

means for measuring the electrical power required to heat the fluid in said second zone to said second predetermined constant temperature, thereby to indicate the flow rate of fluid along said path of travel; and first and second means for insulating said first and second zones, respectively, to prevent heat loss from fluid flowing through said zones, each of said first and second insulating means including:

thermally conductive means insulated from and at least partially surrounding the corresponding zone;

an electrical heating element disposed in thermal contact with said thermally conductive means;

an electrical temperature sensor disposed in thermal contact with said thermally conductive means and in spaced-apart relation with said last named electrical heating element; and circuit means responsive to said temperature sensor disposed in contact with said thermally conductive means for controlling said last named electrical heating element to maintain the temperature of said thermally conductive means the same as the temperature of the fluid in the corresponding zone.

2. The apparatus of claim 1 wherein each of said thermally conductive means is a metal tube.

3. The apparatus of claim 1, wherein the temperature sensors disposed in thermal contact with said thermally conductive means and the temperature sensors disposed in said path of fluid travel each include at least one temperature sensing semiconductor element.

4. The apparatus of claim 1, wherein the heating elements disposed in thermal contact with said thermally conductive means and the heating elements disposed in said path of fluid travel each include a transistor having a pair of main current carrying electrodes.

5. The apparatus of claim 4 wherein said means for measuring the electrical power required to heat the fluid in said second zone includes:

means for indicating the current conducted between the main current carrying electrodes of the transistor disposed in the path of fluid travel in said second zone; and means for maintaining the voltage between said main current carrying electrodes at a constant level.

6. The apparatus of claim 1, further including thermally conductive conduit means disposed in thermal contact with said first insulating means for directing fluid along said path of travel from said first zone to said second zone.

7. An apparatus for measuring the flow rate of a fluid along a path of travel comprising:

means defining a first zone in said path of travel for electrically heating said fluid to a first predetermined constant temperature;

means defining a second zone in said path of travel downstream from said first zone for electrically heating said fluid to a second predetermined constant temperature higher than said first predetermined constant temperature;

said means defining said first zone and said means defining said second zone each including:

porous thermally conductive means forming the path of fluid travel for transferring heat energy to said fluid;

an electrical heating element and an electrical temperature sensor mounted in thermal contact with said porous means;

circuit means responsive to said temperature sensor for controlling the power supplied to said electrical heating element to maintain the temperature of the fluid in the corresponding zone at a preset constant level; and means for measuring the electrical power required to heat the fluid in said second zone to said second predetermined constant temperature, thereby to indicate the flow rate of fluid along said path of travel.

8. The apparatus of claim 7, wherein each of said porous thermally conductive means is formed of sintered metal.

9. The apparatus of claim 7, wherein each heating element is mounted on an upstream portion of the corresponding porous means, and each temperature sensor is mounted on a downstream portion of the corresponding porous means.

* * * * *